United States Patent [19]

McMinn et al.

[11] Patent Number: 5,394,427
[45] Date of Patent: Feb. 28, 1995

[54] HOUSING FOR A SLAB LASER PUMPED BY A CLOSE-COUPLED LIGHT SOURCE

[75] Inventors: Ted S. McMinn, St. Peters; Dana A. Marshall; Danny D. Meyer, both of St. Louis, all of Mo.

[73] Assignee: Cutting Edge Optronics, Inc., St. Louis, Mo.

[21] Appl. No.: 235,689

[22] Filed: Apr. 29, 1994

[51] Int. Cl.$^6$ .......................... H01S 3/04; H01S 3/044
[52] U.S. Cl. ........................................ 372/70; 372/35; 372/75
[58] Field of Search ........................ 372/34, 35, 36, 75, 372/70

[56] References Cited

U.S. PATENT DOCUMENTS

| | | |
|---|---|---|
| 3,633,126 | 1/1972 | Martin et al. . |
| 3,810,041 | 5/1979 | Martin . |
| 4,150,341 | 4/1979 | Ferguson . |
| 4,228,406 | 10/1980 | Lewis et al. . |
| 4,233,567 | 11/1980 | Chernoch . |
| 4,378,601 | 3/1983 | Eggleston, III et al. . |
| 4,468,774 | 8/1984 | Robbins . |
| 4,528,671 | 7/1985 | Robbins . |
| 4,653,061 | 3/1987 | Fukae . |
| 4,730,324 | 3/1988 | Azad . |
| 4,731,795 | 3/1988 | Clark et al. . |
| 4,792,930 | 12/1988 | Kobayashi et al. . |
| 4,852,109 | 7/1989 | Kuchar . |
| 4,881,233 | 11/1989 | von Arb et al. . |
| 4,972,426 | 11/1990 | Steffen . |
| 4,984,246 | 1/1991 | Cabaret et al. . |
| 4,993,041 | 2/1991 | Sidler et al. . |
| 5,012,481 | 4/1991 | Casteleiro . |
| 5,040,187 | 7/1992 | Karpinski . |
| 5,084,888 | 1/1992 | Tajima et al. . |
| 5,128,951 | 7/1992 | Karpinski . |

OTHER PUBLICATIONS

Eggleston et al. "The Slab Geometry Laser–Part 1: Theory" IEEE J Quantum Elec. pp.289–301 Mar. 1984.
Kane et al. "The Slab Geometry Laser–Part II Thermal Effects in a Finite Slab" IEEE JQE pp.1195–1210 Aug. 1985.
Jones, "The Slab Geometry Laser" pp.107–114 Laser Focus/Electro Optics Sep. 1983.
Chan, "Multiple-pass laser pumped Nd:YAG Amplifier:" design pp.3177–3179 Applied Optics Aug. 1987.
Kane et al. "Reduced Thermal Focusing and Birefringence in Zig-Zag Slab Geometry Crystalline Laser'-',IEEE J Q Elec. pp. 1351–1354 Sep. 1983.
McMinn et al. "Laser Damage of YAG Surfaces" NIST special publication 775 pp. 189–210 Oct. 1989.
Achavekar et al. "Parasite Oscillation Suppression Coating for Slab Lasers and their Optical Damage"-NIST Special pub. 775 pp.213–231 Oct. 1989.

Primary Examiner—Rodney B. Bovernick
Assistant Examiner—Robert B. McNutt

[57] ABSTRACT

A housing for a slab laser gain media with a rectangular cross section which provides for a uniform flow of coolant over the slab top and bottom surfaces (18) and (20), while insulating the slab side surfaces (14) and (16). The slab gain media is bonded between two tabs at each end of the housing (48a, 48b, 50a, 50b). The slab top and bottom surfaces are made level with the tab top and bottom surfaces. Seals are placed on the continuous surface formed by the slab top and bottom surfaces and the tab top and bottom surfaces, thus sealing the ends of the housing, and also surrounding the coolant inlets and outlets. Windows (32) and (34) are then placed on top of each seal to form two thin cavities confining the coolant to flow across the slab top and bottom surfaces (18) and (20), and allowing for the close-coupling of either one or two pump sources, such as a two dimensional laser diode array assembly (58) and (60).

13 Claims, 13 Drawing Sheets

HOUSING FOR A SLAB LASER PUMPED BY A CLOSE-COUPLED LIGHT SOURCE

BACKGROUND

1. Field of the Invention

The present invention relates to a housing for holding a slab geometry laser gain media, and specifically a housing which allows for close-coupling of one or two laser diode pump arrays.

2. Discussion of Prior Art

When the slab laser geometry was first being developed in the early 1970's, laser diodes as an efficient pump source were not available. It is only recently that both the technology and availability of laser diode bars, and a method for packaging them, has made two dimensional laser diode pump arrays a commercial reality. A technique for producing such a two dimensional diode laser array is demonstrated in the U.S. Pat. Nos. 5,040,187 and 5,128,951 to Karpinski (1991 and 1992). The advent of lower cost laser diodes for efficient pumping has led to the need for a slab housing which allows for the efficient coupling of a two dimensional diode array into a slab type gain media.

A difficulty with a laser diode array pump source is the rapid divergence of the diode laser light in one axis. One solution to this problem is to place the surface of the diode laser pump array as close as possible to the surface of the gain media. This type of pumping geometry is called close-coupled. An additional constraint on using a diode array for the pump source is that the diode array surface can not be exposed to a liquid coolant which must flow over the gain media when operating above medium average powers. Thus, a means of holding the slab is needed which is specifically adapted for close-coupling a two dimensional diode pump array, and yet isolating the array surface from the coolant.

In U.S. Pat. Nos. 4,378,601 to Eggleston III et al. (1983), 4,653,061 to Fukae (1987), 4,468,774 to Robbins (1984), and 4,993,041 to Sidler et al. (1991), there is described a slab laser housing where the slab is mounted to the head body via some style of side bars or rails. These side bars can serve a variety of functions, such as: thermal insulation of the side faces of the slab, mechanical isolation from thermal expansion of the housing, distribution of the coolant via a series of holes, and making the slab removable for inspection and cleaning. But the side bars are unnecessary if the housing is designed specifically to provide the functions of: thermal insulation, mechanical isolation, coolant distribution, and provides for easy access to the slab optical surfaces.

Another disadvantage of these earlier patents is that they do not provide a housing which allows for placing the pump source close to the gain media while simultaneously isolating the pump source surface from the coolant. These patents all depict a lamp style pump source. With a lamp pump source, one often uses a coolant flooded reflective cavity to direct the pump light into the gain media. This arrangement allows for a more efficient and spatially uniform pumping of the gain media. But this reflective pump cavity is unnecessary if the pump source is a two dimensional laser diode array.

The U.S. Pat. No. 4,984,246 to Cabaret et al. (1991) shows one approach for coupling a diode array pump source to a slab gain media. This patent shows a light duct formed by a set of reflective walls for conveying the pump light to the slab gain media. The diode pump array is not the same size as the slab it is pumping. The purpose of the light duct is to make the pump light spatially uniform over the slab gain media. One disadvantage of this approach are the losses at the reflective surfaces of the light duct.

OBJECTS AND ADVANTAGES

Accordingly, several objects and advantages of our slab laser housing are listed as follows.

(a) It eliminates the need for side bars or rails to hold the slab gain media, by providing a single piece housing which accomplishes many of the functions and benefits derived from the side bars. These benefits are: mechanical isolation of the slab gain media from mechanical strains in the housing, thermal insulation of the side surfaces of the slab gain media thus promoting a thermal gradient in one direction, and a series of coolant channels for the even distribution of coolant to flow across the slab top and bottom surfaces.

(b) It eliminates the need for a reflective cavity or light duct for conveying the pump light efficiently and uniformly to the slab gain media. We accomplish this by employing a close-coupled geometry between a two dimensional diode pump array and the slab gain media's pump surface.

(c) It is particularly suited for pumping the slab gain media with a close-coupled, two dimensional diode laser array, and yet keeping the diode array surface isolated from a liquid coolant.

(d) There is simple access to all important optical surfaces on the slab gain media for either inspection or cleaning.

(e) If both the windows and the slab gain media are transparent to visible light, then the diode pump array can be aligned to the slab gain media while viewing the results thru the bottom window. Thus, good geometrical coupling of the pump light is assured. Additionally, one can easily inspect the condition of the diode pump array surface without disturbing the pump array or gain media's optical alignment. Also one can directly observe and measure aspects of the pump array's performance while it is mounted to the gain media such as the unabsorbed pump power, and wavelength spectra.

(f) The windows also provide an opportunity to place some form of spatial control on the pump light distribution in the gain media. A cylindrical lens, holographic element, or binary optic could easily be attached one or both windows.

(g) The symmetry of the housing design allows for either one or two diode pump arrays.

Further objects and advantages of our slab laser housing will become apparent from a consideration of the drawings and ensuing description.

SUMMARY

The slab housing is formed or machined from a single piece of material. There are two bonding tabs located near each end of the housing. A laser gain media with a rectangular cross section is bonded by its side faces to the tabs of the housing. Between the bonding tabs, there is an empty space along the length of the slab side faces on each side of the housing. After bonding the slab to the housing tabs, this space can be filled with a thermally insulating material. The housing has an input plenum which allows coolant, via a series of holes, to pass uniformly over the top and bottom faces of the gain media. There is a symmetrical series of holes and another plenum on the opposing side of the housing for the return of the coolant. With the slab gain media bonded in place, the housing simultaneously provides mechanical isolation of the slab, thermal insulation of the slab side surfaces, and a even distribution of coolant to flow over the slab top and bottom surfaces.

There are o-ring grooves which surround the coolant input and output holes on the top and bottom sides of the housing. The o-ring grooves extend out onto the housing tabs to which the gain media is bonded. When the gain media is bonded to the housing tabs, the top and bottom surfaces of the gain media are aligned to be level with the bottom surface of the top and bottom o-ring grooves respectively. The top and bottom slab gain media surfaces, in combination with the thin bond line, and the bottom of the top and bottom o-ring grooves, thus form a continuous surface for the o-ring to seal against. A transparent and thin window, sized to cover the o-ring groove, is then used to form the top of the cavity thru which the coolant flows over the gain media surfaces. A retainer ring is used to compress the o-ring between the window and the bottom of the o-ring groove. A cavity is thus formed where a thin layer of coolant can pass over both the top and bottom gain media surfaces.

A two dimensional diode array can now be placed on a high efficiency heat exchanger which fits into the cavity formed by the slab housing and the window. Due to symmetry of the housing design about a horizontal plane, either one or two diode pump arrays may be used to pump the gain media. The surface of the diode pump array can be placed as close to the pump window as possible to minimize the amount of pump light which diverges out past the edges of the gain media. The diode pump light must now travel through a very thin air layer, then the thin window, and finally a thin coolant layer before striking the gain media. The total thickness of all three of these layers can be kept below 5 mm, to minimize coupling losses due to the divergence of the pump light.

DETAILED DESCRIPTION

Figure 1A:
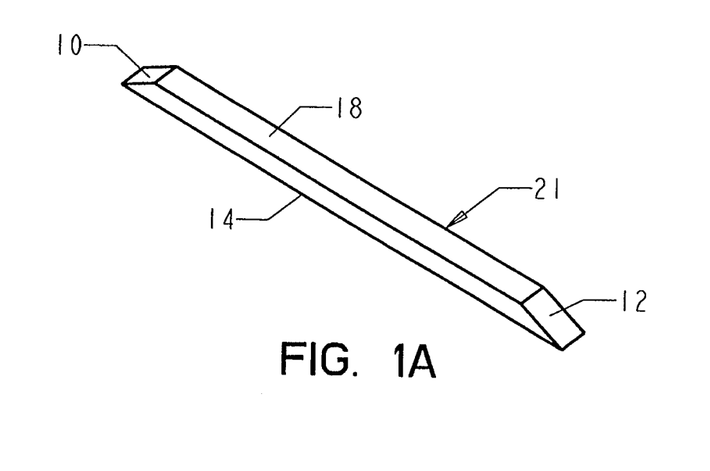
FIG. 1A shows a perspective view of a slab gain media.
Figure 1B:
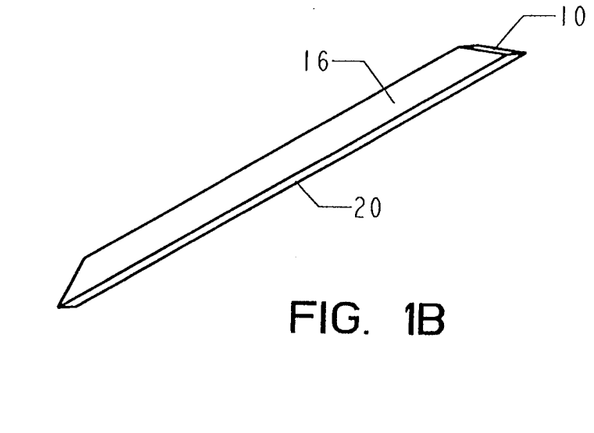
FIG. 1B shows a different perspective view of a slab gain media than that of FIG. 1A, specifically to allow the clear labeling of the surfaces hidden in FIG. 1A.

FIGS. 1A and 1B show perspective views of a slab gain media 21. Slab 21 may be either a glass or crystalline material and has a substantially rectangular cross section. Slab end faces, 10 and 12 have an optical polish and may be inclined at an angle with respect to the top and bottom surfaces. Slab side surfaces 14 and 16 are left with a ground finish. This ground finish promotes improved adherence of the bonding material used to bond slab 21 to the housing. Slab top and bottom surfaces 18 and 20 are substantially parallel to each other and are given an optical polish.

In the example shown, end faces 10 and 12 are cut substantially according to the Brewster angle in order to reduce losses. As is well understood, the end faces may also be inclined at other angles, depending on the exact optical configuration, they may even be rectilinear. Depending on the angle of incidence of a light beam, and the end face angles, top and bottom surfaces 18 and 20 may act as the mirror surfaces which cause a light beam to travel a zig-zag path, alternately reflecting from the top and bottom surfaces, as it travels thru the slab. The mechanism for this reflection may be either total internal reflection, or a multilayer-coating deposited via a chemical or physical vapor deposition method. This coating could be high reflector for the s-polarization state of an optical beam traversing a zig-zag optical path thru the slab. A zig-zag optical path has the well known advantages in reducing the thermal induced lensing and depolarization in the light beam, but our housing is also useful for a slab gain media with a rectangular cross section where the optical path goes straight thru the gain media.

Figure 2:
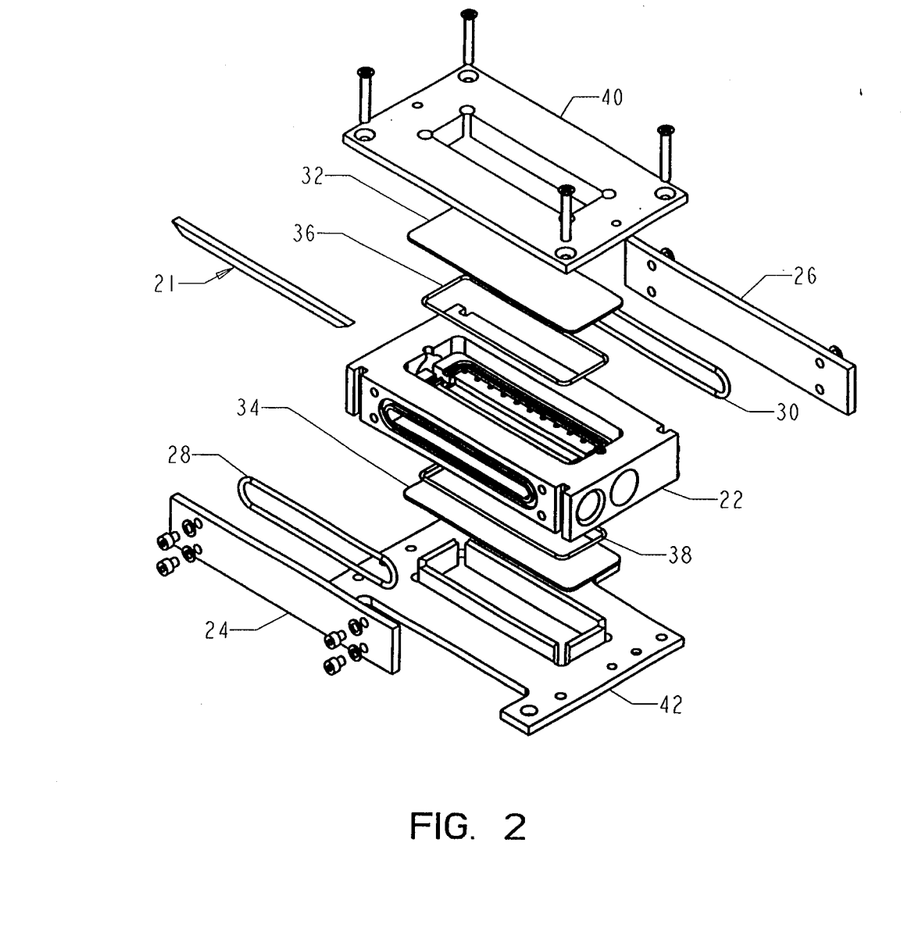
FIG. 2 shows an exploded perspective view of a complete slab housing assembly.
Figure 3A:
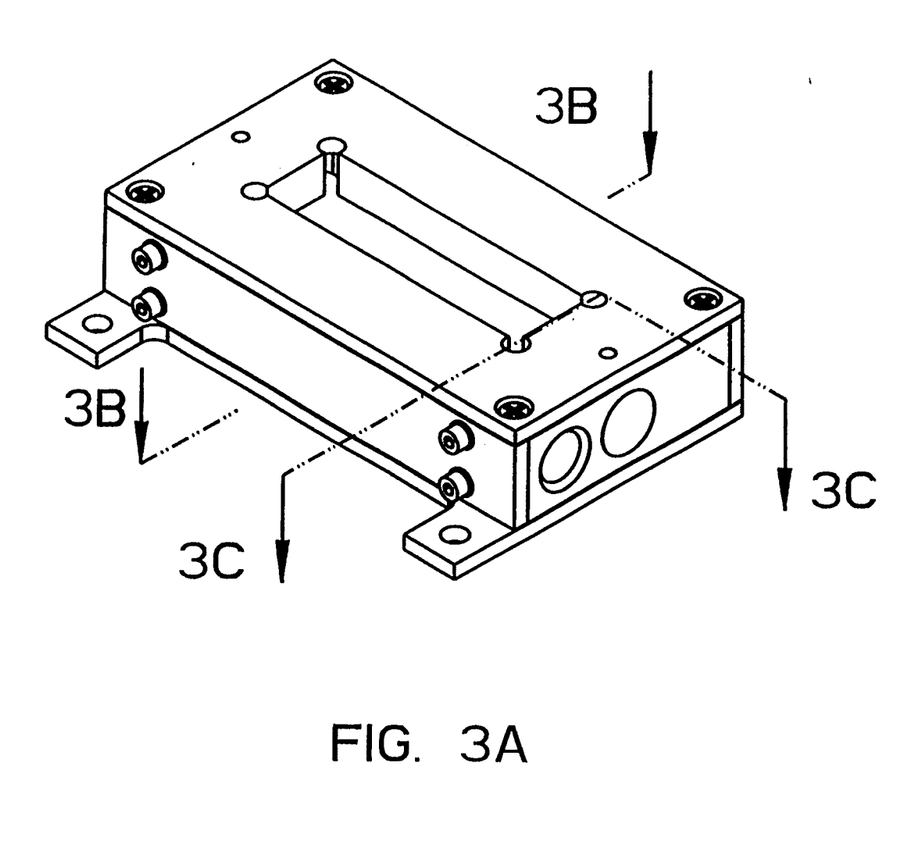
FIG. 3A shows a perspective view of the assembled slab housing and the location of two section cuts.
Figure 3B:
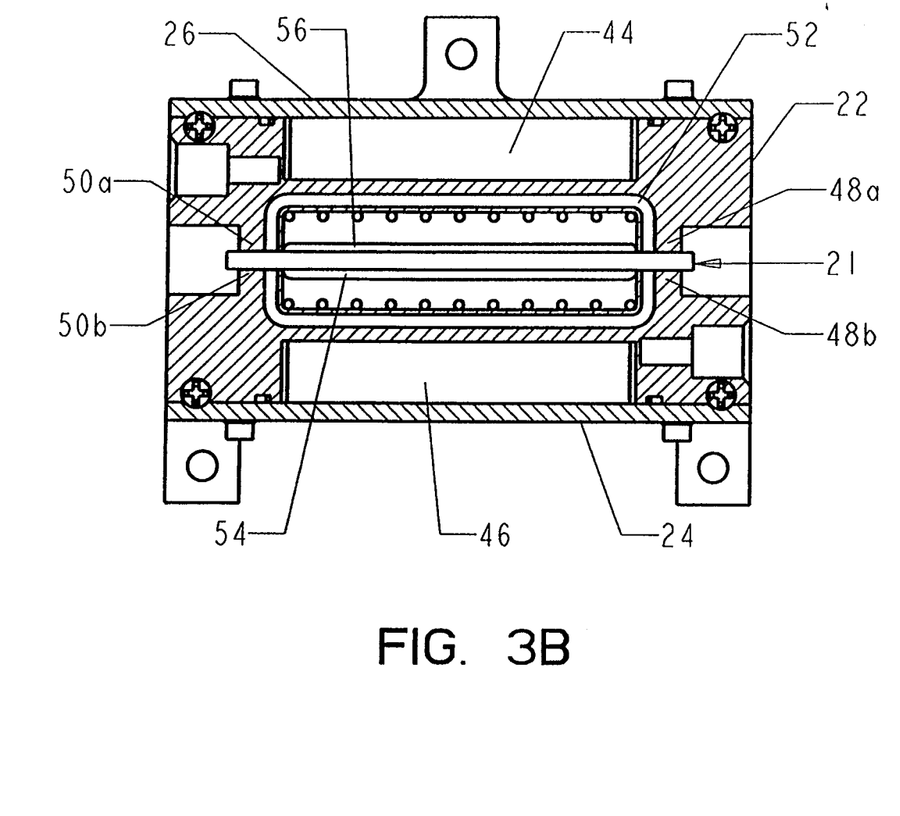
FIG. 3B is a horizontal cross section thru the slab housing assembly showing the slab housing and a slab gain media, the coolant channels, and the o-ring groove which the window seals against.

FIG. 2 shows a perspective, exploded view of the slab housing 22, and the associated pieces needed to make a complete assembly as follows: slab 21, two coolant plenum covers 24 and 26 and corresponding plenum o-rings 28 and 30, top and bottom windows 32 and 34 and corresponding window o-rings 36 and 38, and top and bottom retainer rings 40 and 42. FIG. 3A shows a perspective view of the slab housing assembly, and the locations of the section cuts for FIGS. 3B and 3C. FIG. 3B shows a cross section view taken slightly above the center plane of the housing with a slab gain media in its normal position. The slab housing is formed or machined from a single block of material. The main requirements for material selection being that it must be stable with respect to the coolant to be used and able to withstand the temperatures created by the pump source.

Slab housing 22 is substantially symmetrical about both a vertical and horizontal plane intersecting a line formed by the long axis of the gain media and centered on the cross section of the gain media. The vertical, or side to side, symmetry is due to the means needed to have a transversely flowing coolant across the gain media. The horizontal, or top to bottom, symmetry is to allow the possibility to pump the gain media from two sides.

Figure 6:
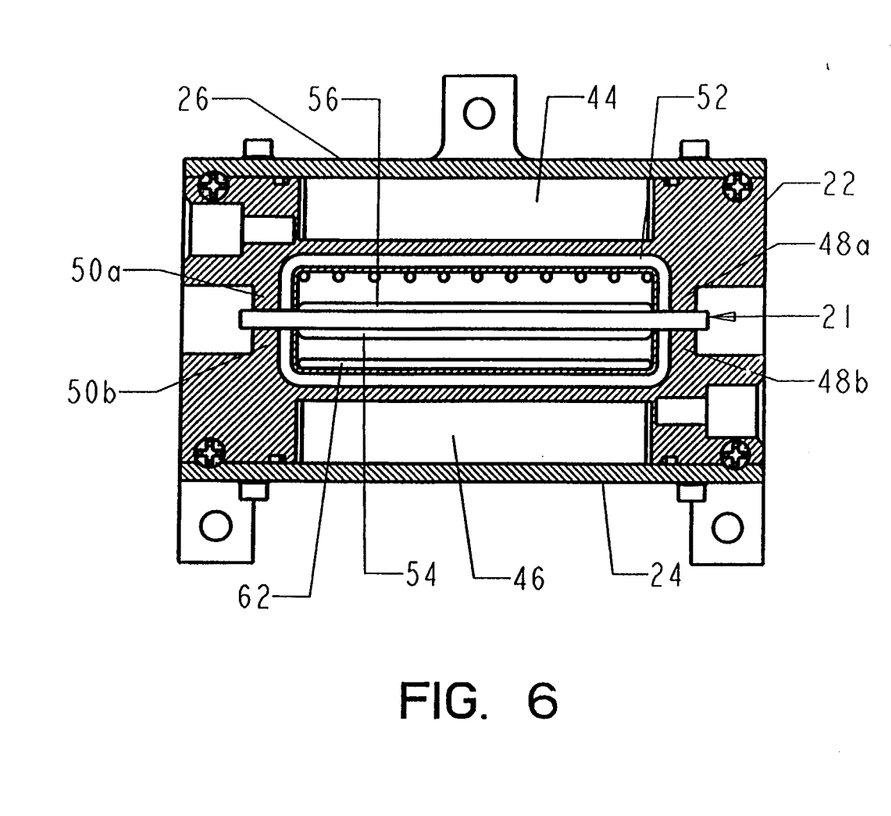
FIG. 6 an cross sectional view where the coolant channels terminate in a slot rather than a series of holes.
Figure 8:
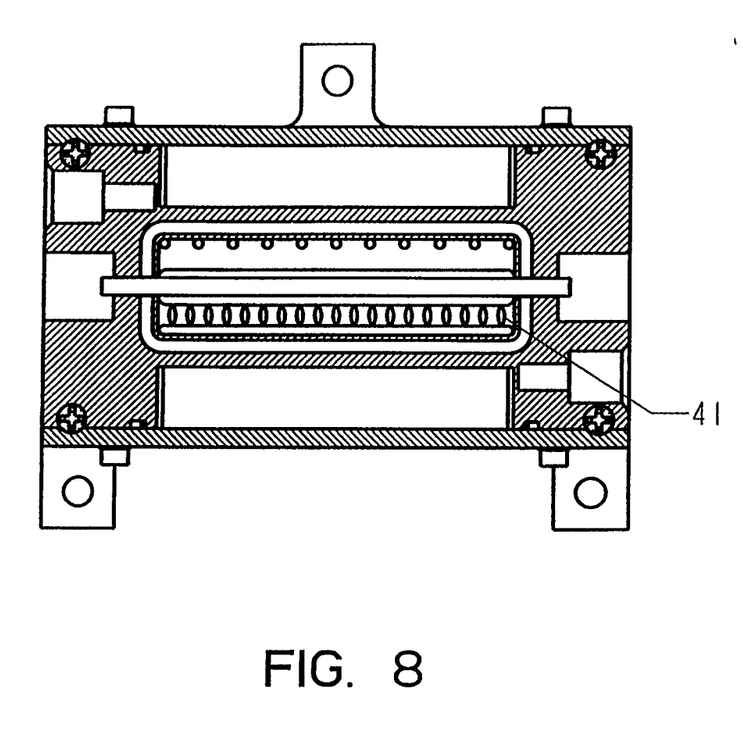
FIG. 8, 9 and 10 show additional embodiments which incorporate different coolant flow modifying means.
Figure 9:
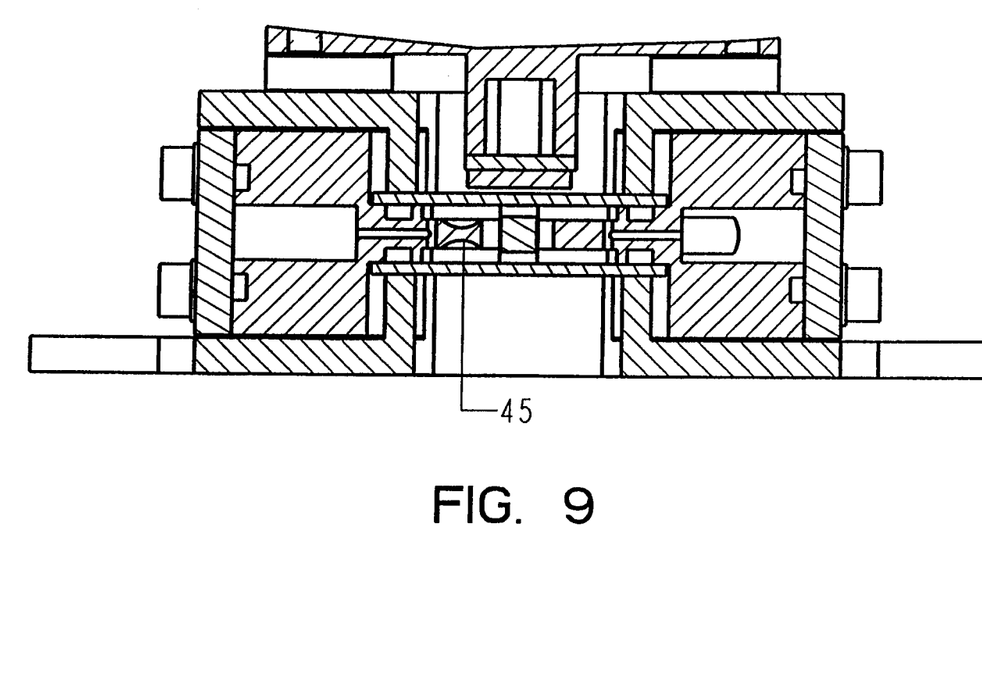
Figure 10:
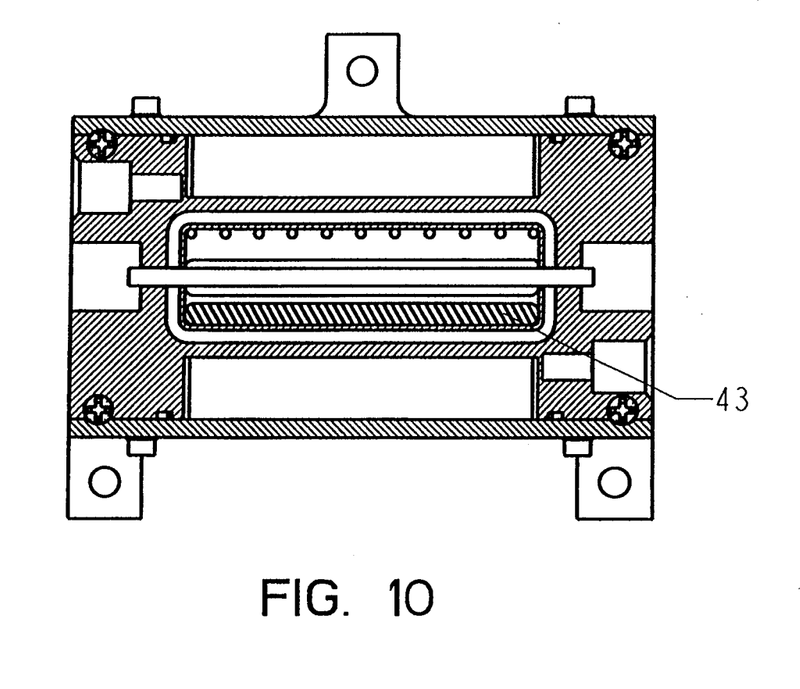

If the gain media is to deliver high or medium average powers, it must be cooled to prevent a thermally induced fracture occuring in the gain media. FIG. 3B shows slab housing 22 has a pair of plenums 44 and 46 for the input and output of a flowing coolant. The input plenum acts to distribute the coolant evenly to a series of channels which deliver the coolant to flow across the slab gain media top and bottom surfaces. Plenums 46 and 44 are sealed with o-rings 28 and 30 shown in FIG. 2, and plenum covers 24 and 26. FIG. 3B shows the coolant channels terminating in a series of holes, evenly spaced, along the length of the gain media. FIG. 6 shows another embodiment of our slab housing that has the coolant channels on at least one side of housing 22 terminate in a slot 62. This slot would allow for better control over the pressure gradient the coolant experiences as it traverses the slab faces. Still another embodiment of our slab housing would be to have .the coolant emerge at one end of the slab and flow down the length of the slab gain media to exit at the opposing end of the housing. Another variant may include a chamber 45, flow modifying vanes 41, or a porous material 43 placed over the coolant channels to promote laminar or uniform flow. These embodiments are shown in FIGS. 8, 9 and 10, respectively.

FIG. 3B shows the bonding tabs 48a, 48b, 50a, 50b located at each end of the housing. Two o-ring grooves, one on the top side, 52 and one on the bottom side run around the outlets of the cooling channels, and out onto the bonding tabs. The dimension of the gap between the bonding tabs is made slightly larger than the side to side dimension of slab 21, thus allowing a thin space for the bonding material. A small area at each end of surfaces 14 and 16 is bonded to the tabs with a material which remains pliant after it has fully cured, such as a silicone RTV. The flexibility of the bonding material provides mechanical isolation of the slab gain media and prevents strain in the media due to thermal induced mechanical changes in the housing.

Figure 3C:
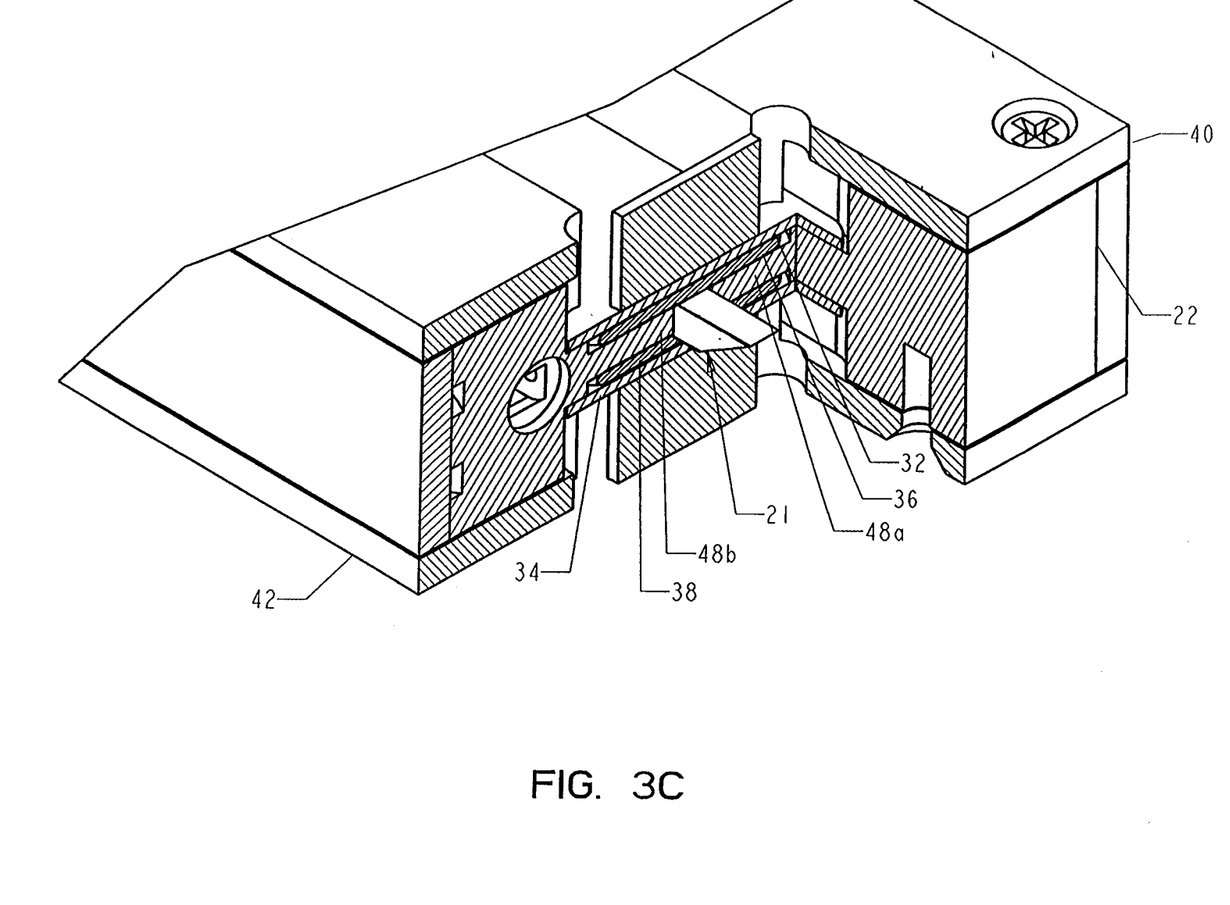
FIG. 3C is a perspective detail cutaway which shows the housing tabs to which the gain media is bonded, and how the o-ring seals the slab ends.

The top to bottom thickness of the bonding tabs is made to precisely match the top to bottom dimension on slab 21. Prior to the bonding, surfaces 18 and 20 are leveled with respect to the bottom surface of o-ring groove 52 and its counterpart on the bottom side of the housing. The result is one contiguous surface that an o-ring can seal against. The bonding material may actually well-up and form a small bump above the surface formed by the slab and the bottom of the o-ring groove, but since the bonding material is pliant, when the o-ring is compressed, it is still able to form a seal against this bump of bonding material. FIG. 3C shows a perspective cutaway detail of the end seal formed around slab 21, including: housing bonding tabs 48a, 48b, 50a, 50b, windows 32 and 34 and o-rings 36 and 38.

FIG. 3B shows there are small spaces 54 and 56 between the coolant channel outlets and slab 21 which run along the length of slab 21 between bonding tabs 48a and 50a, and between bonding tabs 48b and 50b. After slab 21 is bonded at tabs 48a, 48b, 50a, 50b, side spaces 54 and 56 are filled with a thermally insulating material such as the silicone RTV bonding material. The filler material is made level with surfaces 18 and 20. The coolant is therefore not allowed to flow past surfaces 14 and 16. This results in the heat being removed from either surface 18 or surface 20, and a 1 dimensional temperature gradient in the slab gain media. One can take advantage of this one dimensional thermal gradient by sending an optical beam down a zig-zag path, alternately reflecting from surfaces 18 and 20. This zig-zag optical path obtained using a slab geometry is well known to compensate many of the deleterious thermal induced effects in the gain media, such as lensing, and depolarization.

Figure 5:
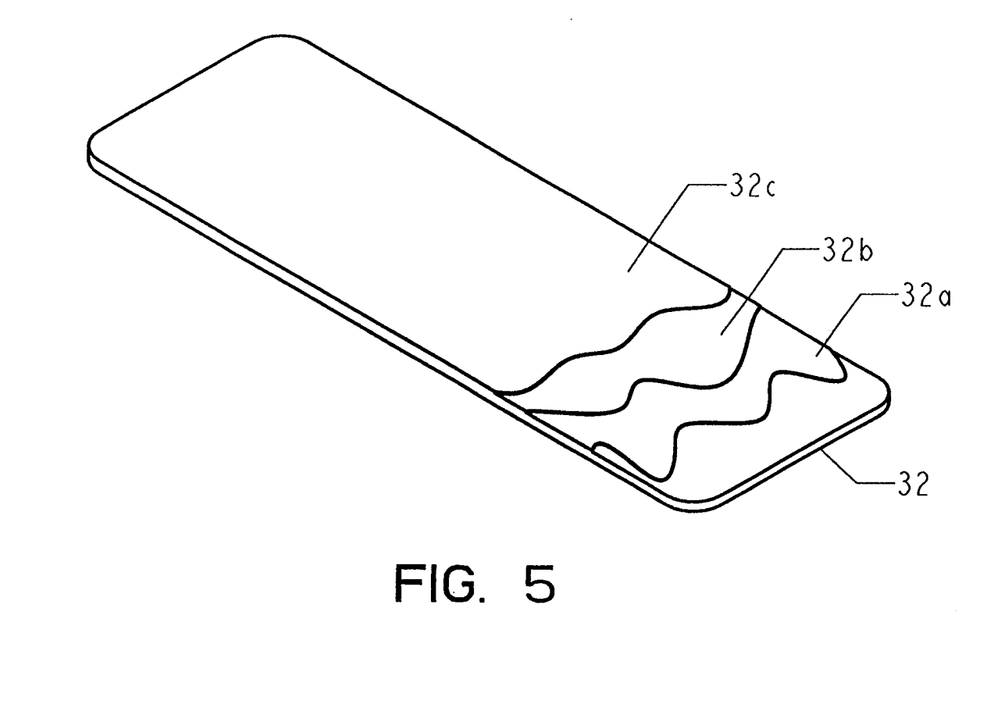
FIG. 5 a perspective view of the top window with coating layers applied to one surface.

FIG. 2 shows two windows 32 and 34 which will become the final surface of the coolant cavities formed with surfaces 18 and 20 and o-rings 36 and 38 as the sides. The cavities force the coolant to flow across the width of the slab gain media. At least one of the windows is made from a material which is transparent to the pump light. Windows 32 and 34 may have either anti-reflection or high-reflector coatings for the pump light wavelengths deposited on one or both of their surfaces. FIG. 5 shows window 32 with three coating layers, 32a, 32b, and 32c. While only three coating layers are depicted in FIG. 5, the actual number of layers will depend on the exact design used, and may range from a single layer to a multilayer design with 20 to 30 individual layers. The coatings can be deposited by either chemical or physical vapor deposition methods. Anti-reflection coatings would be placed on a window thru which the gain media is to be pumped. These coatings would improve the coupling of the pump light into the gain media by reducing the surface reflection losses, and thereby increasing the efficiency of the pumping. A high reflector coating would be placed on the window opposite the pump source. This coating would also increase the pumping efficiency by retroreflecting any pump light which is unabsorbed by the gain media on the first pass, back thru the gain media for a second pass.

In addition to the various coatings, the windows could also be used to focus or modify the spatial distribution of pump light in the slab gain media. Placing a cylindrical lens in contact with a window, or a holographic element on a window surface, are two possible methods for spatially altering the pump light distribution. Another technique might be to coat or etch a binary optic onto a window surface. Spatial control of the pump light distribution could allow one to more efficiently excite certain laser spatial modes in the gain media.

An elastomer o-ring is placed into each of the o-ring grooves. Windows 32 and 34 are placed on top of the o-rings 36 and 38, respectively. FIG. 2 shows retainer rings 40 and 42 which are used to force the windows down to compress the o-rings and form a seal. Retainer rings 40 and 42 are formed by a top rectangular plate with a rectangular hole in its center to allow a pump array access to the gain media. There is a prong which extends down and around the circumference of this hole. The prong makes contact with the window in a rectangle over the o-ring. The top rectangular plate is provide with the necessary holes to allow it to be fastened to housing 22 or to the opposing retainer ring, and to allow the pump array to be fastened to the slab housing or the retainer ring.

Figure 4A:
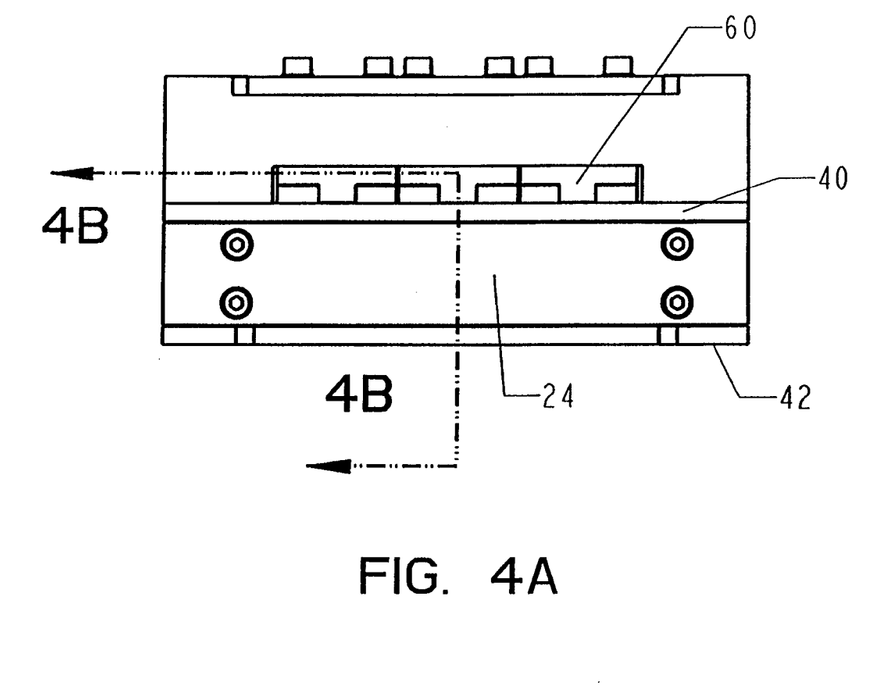
FIG. 4A shows a side view of the slab housing assembly with a single diode pump array mounted on top, and the location of a section cut.
Figure 4B:
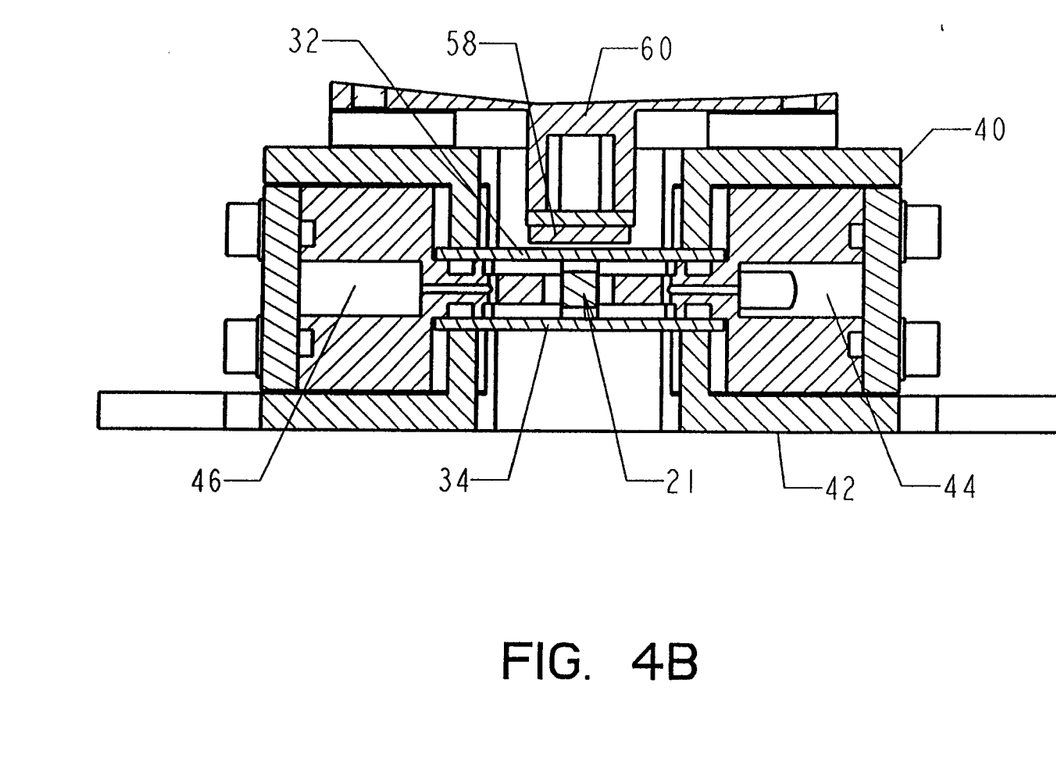
FIG. 4B shows a section cut which demonstrates how a the surface of a diode pump array can be brought in close proximity to the slab gain media.

FIG. 4A shows a side view of an assembled slab housing with a single two dimensional diode pump array assembly mounted on top, and the location of the section cut for FIG. 4B. FIG. 4B shows a cross sectional view where a two dimensional laser diode array pump source 58 and its heat exchanger 60 are mounted to one side of housing 22. More specifically, FIG. 4B demonstrates how our slab housing design allows the diode array surface to be brought in close proximity to the gain media surface. Since the slab housing is symmetrical, an additional two dimensional diode array could be used to pump the opposing surface of the gain media.

FIG. 4B also demonstrates how simple it is to gain access to surfaces 18 and 20 for inspection or cleaning. One need only remove the pump array assembly, then remove retainer rings 40 and 42, and finally remove windows 32 and 34, to gain access to surfaces 18 and 20. If both windows 32 and 34, and slab 21 are transparent to visible light, then an additional advantage of our slab housing is that the diode pump array assembly can be aligned to the gain media while viewing the results thru the alternate window.

Figure 7:
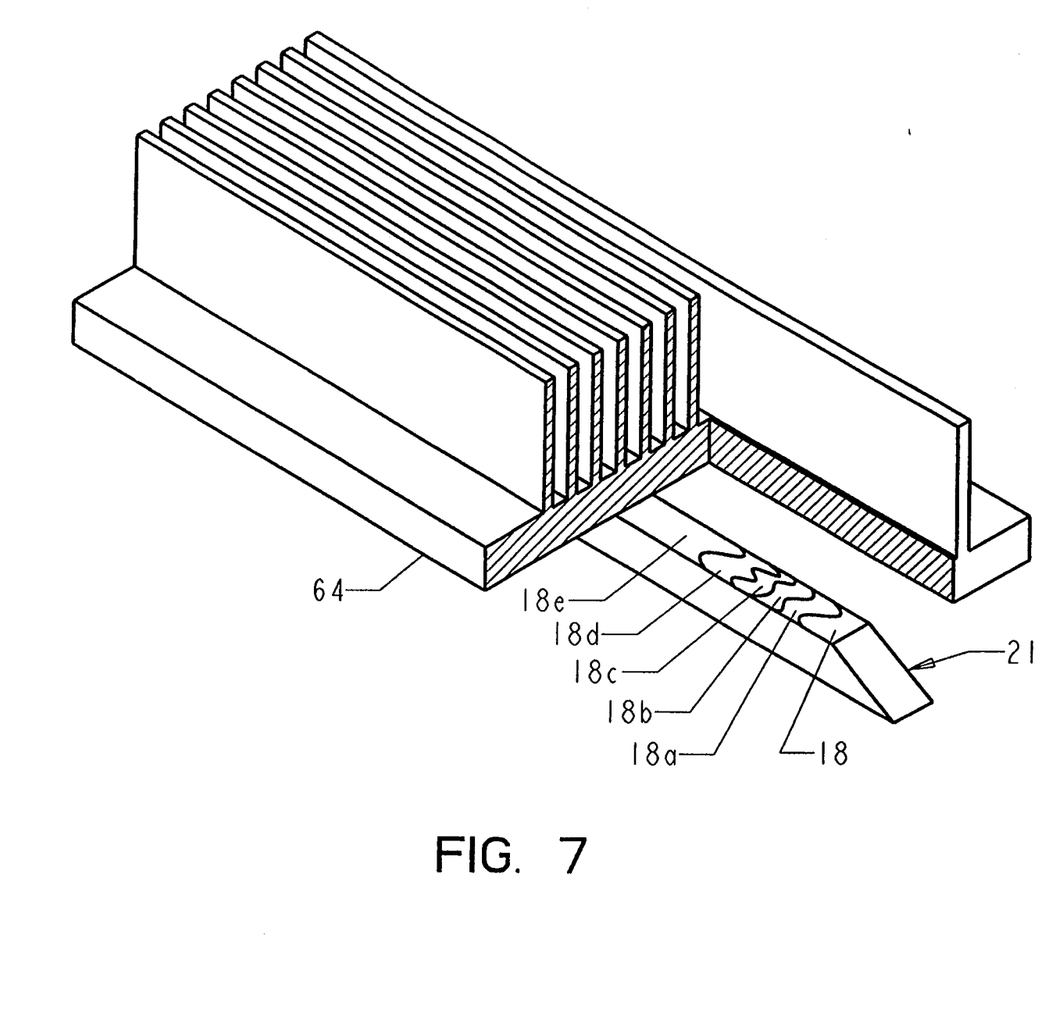
FIG. 7 shows a perspective cutaway of a slab gain media bonded to a heat exchanger, and the necessary thin film coating layers for this embodiment.

FIG. 7 shows an additional embodiment of our slab housing where slab 21 is bonded along surface 18 to a heat exchanger 64. For lower average power operation, the bottom surface heat exchanger may be all that is required, thus the liquid coolant could be eliminated. Alternatively, the liquid coolant could still be used to extract heat from the pump face or slab top surface, while the majority of the heat is transferred conductively thru surface 18 to heat exchanger 64.

A pliant bond layer 18e is used to attach slab 21 to heat exchanger 64. The bonding material must form a thin, pliant layer to avoid straining slab 21, and it must also have a good thermal conductivity, such as a thermally conductive RTV. If one desires to use a zig-zag optical path thru the slab gain media, a multilayer thin film isolation coating design is required on surface 18 which is bonded to the heat sink. FIG. 7 shows multilayer thin film coating layers 18a, 18b, 18c, and 18d. While only 4 coating layers are depicted in FIG. 7, the number of layers will depend on the coating design, and can be as high as 20 to 30 individual layers. This coating is deposited by well known chemical or physical vapor deposition techniques. The coating design can be either a standard high reflector design consisting of alternating layers of high and low index materials, all quarter-wave thick, or an isolation style design.

While the invention has been described with reference to a few specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A slab and holder for use in a face pumped slab laser comprising
    a slab of solid state laser host material having a substantially rectangular cross section with top and bottom surfaces, opposing side surfaces, and opposing end faces,
    a housing body with two opposing ends, further including means for the distribution of a coolant to uniformly flow over said slab top and bottom surfaces, and means for the return of said coolant,
    two tabs at both of said either ends said tabs being integral with said housing body of said housing body and with substantially the same top to bottom thickness as said slab for the purpose of bonding said slab side surfaces to said housing body and simultaneously having said slab top surface to be substantially aligned with the top surfaces of said tabs and said slab bottom surface substantially aligned with the bottom surfaces of said tabs,
    two seals which surround the means for coolant distribution and with a portion of one of said seals lying on the surface formed by said slab top surface and the tab top surfaces, and a portion of one of said seals lying on the surface formed by said slab bottom surface and the tab bottom surfaces,
    two windows, one of which lies on each of said seals to form a cavity on top of said slab and to form a cavity on the bottom of said slab for the confinement of a thin layer of said coolant to flow over said slab top and bottom surfaces,
    and means for sealing to prevent leakage of said coolant from said cavity on top of said slab and from said cavity on bottom of said slab.

2. A slab and holder as defined in claim 1, wherein one of said windows is transparent to a pump light.

3. A slab and holder as defined in claim 1, wherein said windows are transparent to a pump light and visible light.

4. A slab and holder as defined in claim 1, wherein said windows have anti-reflective coatings for a pump light which are deposited via a chemical or a physical vapor deposition process.

5. A slab and holder as defined in claim 1, wherein one of said windows has a high-reflector coating for a pump light which is deposited via a chemical or a physical vapor deposition process.

6. A slab and holder as defined in claim 1, wherein said seals are bonded to said housing body, said tabs, said slab top and bottom surfaces, and said windows.

7. A slab and holder as defined in claim 1, wherein a pump source is a linear or two dimensional laser diode array.

8. A slab and holder as defined in claim 1, wherein said slab top and bottom surfaces are coated with a high reflector for the s-polarization state of an optical beam traversing a zig-zag optical path thru the slab.

9. A slab and holder as defined in claim 1, wherein said windows provide a means for focusing pump light into said slab.

10. A slab and holder as defined in claim 1, further including a chamber, flow modifying vanes, or a porous material placed over the coolant channels to promote laminar or uniform flow.

11. A slab and holder as defined in claim 1, which is used to amplify a light beam.

12. A slab and holder for use in a face pumped slab laser comprising
    a slab of solid state laser host material having a rectangular cross section with top and bottom surfaces, opposing side surfaces, and opposing end faces,
    a housing body with two opposing ends, further including means for the distribution of a coolant to uniformly flow over said slab top and bottom surfaces, and means for the return of said coolant,
    two tabs at end of said housing body and with substantially the same top to bottom thickness as said slab for the purpose of bonding said slab side surfaces to said housing body and simultaneously having said slab top surface to be substantially aligned with the top surfaces of said tabs and said slab bottom surface substantially aligned with the bottom surfaces of said tabs,
    a seal which surrounds the means for coolant distribution and with a portion of one of said seal lying on the surface formed by said slab top surface and the tab top surfaces,
    a window, which lies on said seal to form a cavity on top of said slab for the transportation of a thin layer of said coolant,
    and means for sealing to prevent leakage of said coolant from said cavity on top of said slab,
    a heat exchanger bonded to said slab bottom surface.

13. A slab and holder as defined in claim 14, where said heat exchanger is bonded using an RTV material.

* * * * *